United States Patent [19]

Andersson

[11] Patent Number: 4,763,853
[45] Date of Patent: Aug. 16, 1988

[54] SEAT BELT RETRACTOR REEL

[75] Inventor: Tommy Andersson, Alingsas, Sweden

[73] Assignee: Autoliv Development AB, Vargarda, Sweden

[21] Appl. No.: 900,431

[22] Filed: Aug. 26, 1986

[30] Foreign Application Priority Data

Aug. 28, 1985 [GB] United Kingdom ............... 8521413

[51] Int. Cl.$^4$ .................... B60R 22/38; B60R 22/40
[52] U.S. Cl. .................... 242/107.4 A; 242/107.4 B
[58] Field of Search ............... 242/107.4 A, 107.4 B; 280/803, 804, 806; 297/478

[56] References Cited

U.S. PATENT DOCUMENTS

| 4,209,186 | 6/1980 | Close | 242/107.4 A X |
| 4,244,600 | 1/1981 | Takada | 242/107.4 B X |
| 4,251,091 | 2/1981 | Weissner et al. | 242/107.4 A X |
| 4,260,118 | 4/1981 | Ikesue | 242/107.4 A |

FOREIGN PATENT DOCUMENTS

| 2224986 | 10/1974 | France | 242/107.4 B |
| 0001824 | 1/1977 | Japan | 242/107.4 B |

Primary Examiner—John M. Jillions
Attorney, Agent, or Firm—Marshall, O'Toole, Gerstein, Murray & Bicknell

[57] ABSTRACT

A retractor reel for a vehicle safety belt has a sensor responsive to the speed or acceleration of belt withdrawal to actuate a reel locking mechanism and also has a sensor responsive to vehicle acceleration or deceleration to actuate the locking mechanism. A solenoid actuated device is provided to retain both the sensors in the inoperative position. The reel can thus safely be used in an automatic seat belt arrangement of the type in which a carriage moves withdrawing belt from the reel to locate the belt in the operative position.

11 Claims, 1 Drawing Sheet

SEAT BELT RETRACTOR REEL

BACKGROUND OF THE INVENTION

The present invention relates to a seat belt retractor reel and more particularly to a seat belt retractor reel suitable for use in a vehicle such as a motor car.

Many different seat belt arrangements have been provided for use in vehicles such as motor cars. A typical seat belt arrangement incorporates a retractor reel adapted to retract the seat belt when the belt is not in use. A typical retractor reel is provided with a mechanism adapted to lock the shaft of the reel when an accident arises. Such a mechanism may include a sensor which is responsive to acceleration or deceleration of the vehicle in such a way that if an acceleration or deceleration in excess of a predetermined limit is detected the sensor responds to cause the shaft of the reel to be locked. Typically such a sensor may comprise a pendulum, or a ball in a cup, or a member adapted to topple over when subjected to a predetermined force. When the pendulum, ball or toppling member move in a predetermined way the locking mechanism is actuated. Additionally various prior art reels also include a sensor responsive to the withdrawal of the belt from the reel, the sensor being adapted to respond to seat belt withdrawal in excess of a predetermined velocity or in excess of a predetermined speed, the sensor being adapted to lock the shaft of the reel if the belt is withdrawn at an excessive speed or with an excessive acceleration. Typically such a sensor incorporates an inertia weight loosely mounted on the shaft and spring biassed to follow movement of the shaft. On rapid movement of the shaft the inertia weight is unable to follow the movement of the shaft, and thus a relative movement occurs between the inertia weight and the shaft. The locking mechanism operates in response to this relative movement.

It has been proposed recently to provide automatic seat belt systems. In such an automatic seat belt system when a person enters a motor vehicle and sits in the seat, the seat belt is automatically located in position retaining the person in the seat. Typically such an automatic seat belt system incorporates a track that is built into the motor vehicle, and one or more carriages are provided which move along the track. The or each carriage carries part of the seat belt. Typically, when a person sits in the seat the carriages move along the track, withdrawing seat belt from a retractor reel, and the carriages move in such a way that the seat belt is located correctly on the person sitting in the vehicle seat, the seat belt then being clamped or retained in position.

If a retractor reel of the type described above is utilised with an automatic seat belt system, as described, various problems can arise.

In a typical prior art retractor reel the sensor that is responsive to vehicle acceleration or deceleration is also responsive to an inclination of the vehicle, since typically the sensor comprises a pendulum, or a ball in a cup, or an element which topples over when subjected to appropriate forces. It will thus be appreciated that if a prior art reel of this type is utilised with an automatic seat belt system as described, if a motor vehicle is parked on a slope when a person enters the motor vehicle, there is a risk that the retractor reel will be in the locked condition, and then when the carriage or carriages move along the track the belt will not be withdrawn from the reel. This is clearly a major problem.

A further problem can arise if a conventional prior art reel is utilised with an automatic seat belt system as described since if the carriage withdraws the belt from the reel with a speed or acceleration which is in excess of the speed or acceleration that causes the sensor responsive to belt movement to react, again the reel will become locked, thus preventing the further withdrawal of belt.

The present invention seeks to provide a seat belt system in which the above-described problem is reduced or obviated.

BRIEF SUMMARY OF THE INVENTION

According to one aspect of this invention there is provided a retractor reel for a vehicle safety belt arrangement, said reel comprising rotatable means on to which part of the safety belt may be wound, locking means adapted to lock the rotatable means in position to prevent the withdrawal of belt therefrom, sensor means adapted to actuate the locking means, said sensor means comprising at least one sensor element either responsive to the speed or acceleration of belt withdrawal, or responsive to the acceleration or deceleration of the vehicle in which the reel is fitted, means being provided selectively to retain said sensor element in an inoperative position.

Preferably said sensor means comprise a first sensor element responsive to the speed or acceleration of belt withdrawal, a second sensor element responsive to the acceleration and deceleration of the vehicle in which the reel is fitted, means being provided selectively to retain both sensor elements in an inoperative position.

Preferably said selectively operable means are actuated by means of a solenoid.

Conveniently the reel may comprise a sensor element responsive to the speed or acceleration of belt withdrawal from the reel, said sensor including an inertia weight mounted about the axis of said rotatable means and biassed to move with the rotatable means by resilient means, said sensor element being arranged to actuate said locking means when a predetermined rotational movement between the inertia weight and the shaft is exceeded, said selectively operable means being adapted to retain the inertia weight in a predetermined position relative to the rotatable means.

Preferably said inertia weight is provided with a portion which extends diametrically of the axis of said rotatable means, transversely to the axis, said selectively operable means including an element movable axially including a portion adapted to engage and retain said diametrically extending portion of the inertia weight, so that the inertia weight co-rotates with the rotatable means.

Conveniently said axially movable element comprises a plunger, the end face of the plunger being provided with a diametrically extending groove adapted to engage and retain the diametrically extending portion of the inertia weight, said plunger being provided with means engaging said rotatable means so that at least part of the plunger co-rotates with the rotatable means, thus causing the inertia weight to co-rotate with the rotatable means.

Advantageously the plunger comprises a head with a stud rotatably mounted thereon, said stud defining one or more cam faces engageable with a cam element such that movement of the cam element causes the plunger to be driven into and out of the engagement with the diametrically extending portion of the inertia weight.

Advantageously the reel may comprise a sensor responsive to acceleration or deceleration of a vehicle in which the reel is fitted, said sensor being constituted by an element which moves form a first predetermined position to a second predetermined position when an acceleration or deceleration in excess of a predetermined limit is experienced, such movement causing a corresponding movement of a locking mechanism, the said selectively operable retaining means being adapted to retain said element in the first position.

Preferably said selectively operable retaining means exert a pressure on part of the locking mechanism actuated by said element, the pressure being adapted to retain the movable element in the first position.

Conveniently the part of the selectively operable means applying the pressure to the locking mechanism is resilient.

Advantageously the said element is in the form of a "standing man".

Preferably actuation of the or each sensor causes a carrier wheel to rotate on the subsequent extraction of belt from the reel, movement of the carrier wheel bringing locking elements into engagement with one or more toothed wheels carried by rotatable means to lock the rotatable means in position.

Conveniently two diametrically opposed locking bars are provided, said locking bars being engageable with two toothed wheels carried by the rotatable means, the toothed wheels being located on either side of a side wall of a housing in which the rotatable means is mounted, the locking bars passing through apertures in the end wall of the housing.

This invention also relates to a seat belt arrangement, such as an automatic seat belt arrangement, incorporating such a reel.

INTRODUCTION TO THE DRAWINGS

In order that the invention may be more readily understood and so that further features thereof may be appreciated, the invention will now be described, by way of example, with reference to the accompanying drawings in which:

FIG. 1 is a vertical part sectional view of one end of a shaft of a retractor reel for use in a seat belt arrangement in accordance with the invention; and FIG. 2 is a vertical elevational view of part of the reel shown in FIG. 1, with parts omitted for the sake of clarity of illustration.

DESCRIPTION OF PREFERRED EMBODIMENTS

Figure 1:
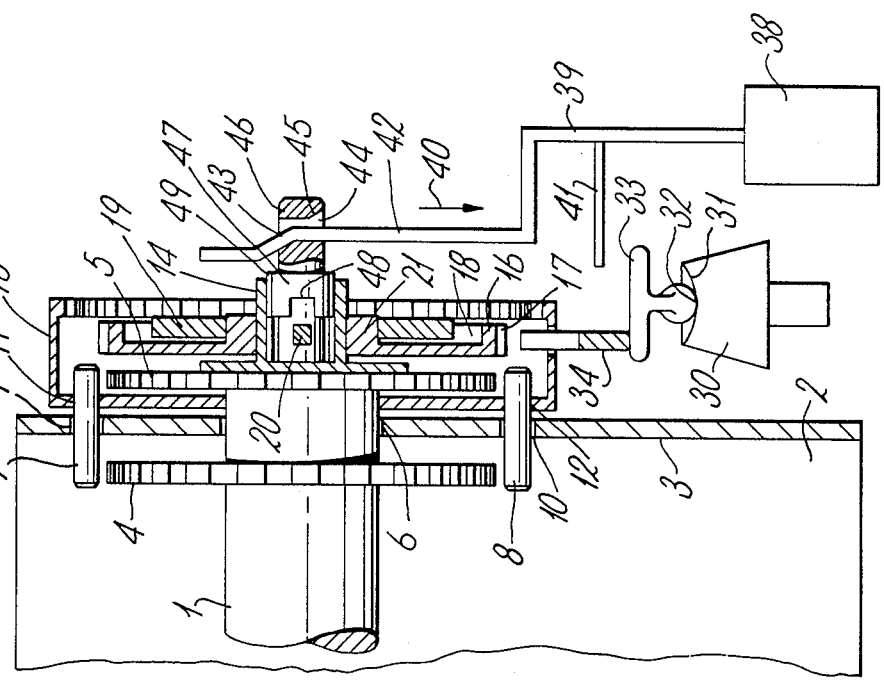

Referring now to the accompanying drawings, FIG. 1 illustrates part of a retractor reel for receiving a webbing strap forming part of the seat belt arrangement. The strap is not shown.

One end of the strap may be mounted, in a conventional manner, on a shaft 1 which is rotatably mounted in a housing 2 having endwalls 3 which extend perpendicularly to the axis of the shaft 1.

The right hand end of the shaft 1 is illustrated in FIG. 1 and it can be seen that the shaft 1 is formed integrally with two toothed wheels 4, 5 which are located on either side of the end wall 3 of the housing. It will thus be appreciated that part of the shaft 1 passes through an aperture 6 formed in the end wall 3.

In the embodiment illustrated two locking bars 7,8 are provided. The locking bars extend, respectively, through elongate apertures 9,10 formed in the end wall 3 of the housing. The locking bars also extend through elongate apertures 11,12 formed in a locking bar carrier wheel 13 which is rotatably mounted about the shaft 1. The apertures 11,12 are formed in part of the locking bar carrier wheel 13 located between the end wall 3 of the housing and the toothed wheel 5. The ends of the locking bars 7,8 are substantially aligned with but, in the condition illustrated in FIG. 1, slightly spaced from the toothed peripheries of the toothed wheels 4 and 5.

The arrangement of the elongate apertures 9,10 and 11,12 is such that on rotation of the carrier wheel 13 relative to the end wall 3 the locking bars 7,8 are moved along the elongate apertures 9,10 so that the locking bars 7,8 are brought into engagement with the toothed peripheries of the toothed wheels 4,5 thus serving to lock the shaft against further rotation.

Means are provided (not shown) resiliently to bias the carrier wheel 13 to a position in which the locking bars 7, 8 are disengaged from the toothed peripheries of the wheels 4, 5 thus permitting free rotation of the shaft 1.

The shaft 1 is provided with an extension or end piece in the form of two inwardly facing arcuate lugs 14 (which can be seen most clearly in FIG. 2) each of the arcuate lugs having, in its inner face, a recess or rebate 15. The arcuate lugs effectively form a boss, and a wheel 16 having a toothed outer periphery 17 is carried on the boss. The wheel 16 is so mounted that it co-rotates with the shaft 1. Carried in a recess 18 formed in the wheel 16 is an annular inertia weight 19. The annular weight 19 has a diametrically extending cross piece 20 which extends through the boss 14.

On the radially innermost portion 21 of the wheel 16 a projecting pin 22 carries a locking lever 23 which is pivotally movable about the pin 22. The locking lever is biassed to an inner position (illustrated in FIG. 2) by means of a spring 24, one end of which is connected to the free end 25 of the locking lever 23, the other end of the spring 24 being connected to another pin 26 mounted on the radially innermost part 21 of the wheel 16. The pins 22 and 26 are diametrically opposed. The inertia weight 19 is provided with a projecting pin 27 which engages the underside of the lever 23.

Figure 2:
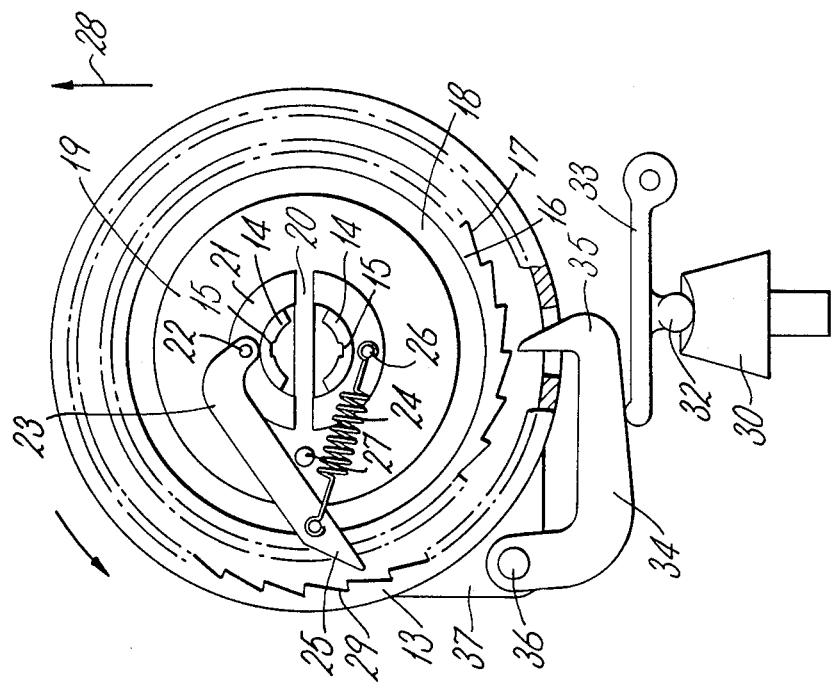

It will be appreciated that if a seat belt wound on the shaft 1 is withdrawn rapidly in the direction of the arrow 28 in FIG. 2 the boss formed by the arcuate lugs 14 will rotate, and the wheel 16 will also rotate. However, inertia weight 19 will tend to remain stationary, and will thus tend to force the locking lever 23 radially outwardly. The free end of the locking lever 25 may thus become engaged with a toothed interior 29 provided on the carrier wheel 13, and continued extraction of the belt will cause the carrier wheel 13 to rotate. Thus, as described above, the locking bars 7 and 8 will be brought into locking engagement with the toothed peripheries of the wheels 4 and 5.

It will be appreciated that the inertia weight 19 and the associated elements described above are effectively a sensor which is responsive to the speed or acceleration of belt withdrawal in the direction of the arrow 28. If the belt is only withdrawn slowly, or with a low acceleration, the inertia weight 19 will be able to follow the movement of the shaft 1 without the locking lever 23 being actuated. However, if the belt is withdrawn at a high speed or with a high acceleration the locking lever 23 will be actuated.

A sensor responsive to vehicle speed is also provided, this sensor being contituted by a "standing man" 30 of a conventional design. The "standing man" is a small weight retained in an appropriate cup or hollow, and so designed that when subjected to a predetermined acceleration or deceleration the weight will topple over. The weight defines a recess 31 in the upper part thereof, and a follower 32 engages in the recess. When the weight topples the follower is lifted up slightly. As can be seen in FIG. 2 the follower 32 is formed integrally with a movement amplifying lever 33, and the movement amplifying lever 33 engages a locking lever 34 having a tooth or detent 35 which, when the "standing man" topples is brought into engagement with the toothed periphery 17 of the wheel 16. It is to be noted that the lever 34 is pivoted by means of a pivot pin 36 to a lug 37 that is formed integrally with the carrier wheel 13. Thus, when the tooth or detent 35 has been brought into engagement with the toothed periphery 17 of the wheel 16 and the belt is extracted in the direction of the arrow 28 as shown in FIG. 2 the toothed wheel 16 will rotate slightly, in synchronism with the rotation of the shaft 1, thus causing the carrier 13 to rotate which, in turn, will bring the locking bars 7, 8 into contact with the outer peripheries of the toothed wheels 4, 5 thus again locking the shaft 1 against further rotation.

It will be appreciated that, apart from a few design details, the seat belt reel as described above is very similar to a prior proposed seat belt reel.

In the presently described embodiment of the invention means are provided which can be selectively activated to retain both the belt withdrawal sensor (as constituted by the inertia weight 19 and the associated mechanism) and the vehicle acceleration/deceleration sensor (as constituted by the "standing man" 30 and the associated mechanism) in the inoperative position. It will this be appreciated that this mechanism can be activated at appropriate times, thus holding both the sensors in the inoperative position, to permit seat belt to be withdrawn from the reel regardless of the speed at which the belt is withdrawn and also regardless of whether the vehicle in which the seat belt assembly is mounted is parked on a slope.

The means which retain the sensors in the inoperative position are actuated by means of a solenoid 38 which, when activated, draws an arm 39 downwardly as indicated by the arrow 40. The arm carries a resilient extension 41 which, when the solenoid is not activated, is located immediately above the movement amplifying lever 33. However, when the solenoid is activated the resilient extension 41 engages the upper surface of the lever 33, and thus exerts a downward bias on the follower 32. In view of the concave configuration of the recess 31 in the upper part of the "standing man" 30 the result is that the "standing man" is returned to an upright position, and thus the locking lever 34 does not have the tooth or detent 35 thereof engaged with the toothed periphery 17 of the wheel 16.

It is to be appreciated that the resilience of the resilient extention 41 is so chosen that in normal circumstances the "standing man" will be returned to an upright condition when the solenoid 38 is activated. However, for safety reasons, it is preferred that the reilience is such that if, whilst the solenoid 38 is activated, the vehicle in which the described arrangement is mounted is subjected to a severe acceleration or deceleration, then the "standing man" 30 will still be able to topple, forcing the movement amplifying lever 33 upwardly against the resilient bias imparted thereto by the resilient projection 41. Thus if, for example, the solenoid 38 becomes jammed, the seat blet mechanism will still provide some degree of protection to a person wearing the seat belt if an accident arises.

The arm 39 associated with the solenoid extends upwardly and supports a further substantially rigid arm 42 which carries a sloping or cam portion 43. The sloping or cam portion 43 passes through a passage 44 provided with sloping faces 45 adapted to cooperate with the cam portion 43 of the arm 42. The passage 44 is formed in a stud 46 which carries a rotatable head 47 which is located between the arcuate lugs 14 provided on the extension of the shaft 1. The head and stud together form a plunger. A transverse groove 48 is formed in the face of the rotatable head 47 which faces away from the stud 46 and is dimensioned to receive the cross piece 20 that forms part of the inertia weight 19. The head 47 is provided with two diametrically opposed projections 49 which are received within the above-described recesses 15 formed inthe arcuate lugs 14. It will thus be appreciated that as the shaft 1 rotates the head 47 can rotate relative to the stud 46.

It is to be appreciated that when the solenoid 38 is activated the arm 42 will move downwardly in the direction of the arrow 40 and the cam portion 43 will cooperate with the sloping faces 45 in the passage 44 thus serving to drive the stud 46 to the left as shown in FIG. 1. By virtue of the engagement of the projections 49 in the recesses 15 the transverse slot 48 will be brought into engagement with the cross piece 20 of the inertia weight 19. The mouth of the slot 48 may have to be widened appropriately to enable this to occur. However, once the head 47 has been driven inwardly so that the transverse slot 48 is in engagement with the cross piece 20 of the inertia weight 19 it will be appreciated that when the shaft 1 is rotated the inertia weight will be rotationally driven in synchronism with the shaft, thus preventing the locking lever 23 from being driven outwardly to a position in which the free end 25 of the locking lever 23 engages the toothed inner periphery 29 of the carrier wheel 13.

It will thus be appreciated that when the solenoid 38 is activated both the sensor responsive to withdrawal of the belt and the sensor responsive to vehicle motion are held in an inoperative position.

It is to be appreciated that when the seat belt reel as described above is utilised, when the solenoid is not activated the seat belt may be withdrawn from the reel at a relatively slow rate without the reel locking. However, if the seat belt is withdrawn from the reel at a high speed or with a high acceleration the inertia weight 19 will move relatively to the wheel 16, and as, has been described, this will result in the shaft 1 being locked in position by means of the locking bars 7 and 8.

If a motor vehicle fitted with a seat belt reel described above is involved in an accident and is subjected to a severe acceleration or deceleration the "standing man" will topple and, as has been described above, this again will result in the shaft 1 being locked in position by means of the locking bars 7 and 8. Thus, in either event, the shaft 1 is locked in position thus preventing any further length of belt being paid out.

The described seat belt reel may be utilised, for example, in conjunction with an automatic seat belt arrangement of the type in which a carriage moves around a track provided in a motor vehicle, movement of the carriage resulting in seat belt being paid out from the reel. When the carriage is moved the solenoid 38 will be activated, thus retaining the belt sensor and the vehicle sensor in the inoperative position, thus preventing the shaft 1 from being locked. Thus the belt can easily be paid out. As a safety measure, in case the solenoid becomes jammed, part of the mechanism is resilient so that, even if the solenoid is jammed, if the vehicle is subjected to a severe acceleration or deceleration the vehicle sensor will still operate to lock the shaft.

Whilst the invention has been described with reference to one specific embodiment it is to be appreciated that many modifications or improvements may be effected without departing from the scope of the following claims.

At this stage it would be mentioned that whilst in most European countries it is necessary for a seat belt reel to have both a sensor responsive to vehicle acceleration and deceleration and a sensor responsive to the speed or acceleration of belt withdrawal to operate the shaft locking mechanism, this is not the case in all countries of the world. Thus in certain countries seat belt reels may be provided which only have one sensor. Of course, if a reel only having one sensor is utilised it is only necessary to provide means to retain that one sensor in the inoperative condition.

What is claimed is:

1. A retractor reel for a vehicle safety belt arrangement, said reel comprising rotatable means (1) on to which part of a safety belt may be wound, locking means, (23,29,13,7,8,4 and 5) adapted to lock the rotatable means in position to prevent the withdrawal of the belt therefrom, sensor means adapted to actuate the locking means, said sensor means comprising at least a sensor element (19) comprising an inertia weight (19) mounted for rotation about the axis of said rotatable means (1) on to which part of the safety belt may be wound, and being biased to move with the rotatable means by a resilient means (24), said sensor being arranged to actuate said locking means (23,29,13,7,8,4 and 5) when a predetermined rotational movement between the inertia weight and the rotatable means is exceeded, responsive to the speed or acceleration of belt withdrawal, means being provided which are selectively operable to retain the sensor element in an operative position, said selectively operable retaining means including a movable element (46, 47) mounted on the rotatable means (1) and movable to a position in which it engages and retains a portion of the locking means characterized in that said element (47) has means (48) to directly engage and retain a portion (20) of the inertia weight (19) thus ensuring that the inertia weight co-rotates with the rotatable means, thus retaining the inertia weight in a predetermined position relative to the rotatable means and thus preventing actuation of said locking means.

2. A reel according to claim 1 wherein said movable element (46, 47) comprises a plunger, one end (47) of the plunger being provided with said means (48) to engage and retain a portion (20) of the inertia weight, the said one end (47) of the plunger being provided with means (49) engaging said rotatable means (1) so that at least the part (47) of the plunger which engages the inertia weight (19) co-rotates with the rotatable means.

3. A reel according to claim 2 wherein the inertia weight is provided with a portion (20) which extends diametrically of the axis of said rotatable means, and the said portion (47) of the plunger adapted to engage and retain the inertia weight has a recess (48) to engage and retain said diametrically extending portion of the inertia weight.

4. A reel according to claim 2 wherein the plunger comprises a head (47) with a stud (46) rotatably mounted thereon, the head (47) being adapted to engage the said portion (20) of the inertia weight (19), the stud (46) defining one or more cam faces (44) engageable with a cam element (42), such that movement of the cam element causes the plunger to be driven to and out of engagement with the inertia weight, there being means (38) selectively to control the position of said cam element operable selectively to retain said sensor responsive to the speed or acceleration of the belt withdrawal in said inoperative position.

5. A reel according to claim 2 wherein the means engaging the rotatable means is at the said one end (47) of the plunger and comprise projections (49) received in recesses (15) of the rotatable means.

6. A reel according to claim 2 additionally incorporating a sensor (30) responsive to acceleration or deceleration of the vehicle in which the reel is fitted, said sensor being constituted by an element (30) which moves from the first predetermined position to a second predetermined position when an acceleration or deceleration in excess of a predetermined limit is experienced, such movement causing corresponding movement of a locking mechanism (33, 34), the reel further comprising selectively operable retaining means (38, 39, 41) adapted to retain said element in a first position.

7. A reel according to claim 6 wherein said selectively operable retaining means (41) exerts a pressure on part (33) of the locking mechanism actuated by said element (30), the pressure being adapted to retain the movable element in the first position.

8. A reel according to claim 7 wherein the part (33) of the selectively operable means applying the pressure to the locking mechanism is resilient.

9. A reel according to claim 6 wherein the said element (30) is in the form of a "standing man".

10. A reel according to claim 1 wherein actuation of the or each sensor causes a carrier wheel (13) to rotate on the subsequent extraction of belt from the reel, movement of the carrier wheel bringing locking elements (7, 8) into engagement with one or more toothed wheels (4, 5) carried by rotatable means to lock the rotatable means in position.

11. A reel according to claim 10 wherein two diametrically opposed locking bars (7, 8) are provided, said locking bars being engageable with two toothed wheels (4, 5) carried by the rotatable means, the toothed wheels being located on either side of a side wall (3) of a housing in which the rotatable means is mounted, the locking bars passing through apertures (9, 10) in the wall of the housing.

* * * * *